Patented Feb. 21, 1950

2,498,454

UNITED STATES PATENT OFFICE 2,498,454

HARDENABLE EMULSION SERVING AS BINDING AGENT AND PROCESS OF MAKING SAME

Luzius Schibler, Basel, Switzerland, assignor to Ciba Limited, Basel, Switzerland, a Swiss firm No Drawing. Application November 21, 1946, Serial No. 711,462. In Switzerland November 28, 1945

7 Claims. (Cl. 260—6)

This invention is concerned with an improvement in the manufacture of a hardenable emulsion serving as binding agent and suitable for the fixation of finely dispersed pigments on fibrous materials, especially for printing with pigments. It comprises the emulsions themselves and the process of their manufacture, as well as the fixation of finely dispersed pigments on fibrous materials therewith and the thus treated fibrous materials.

As fibrous materials for the purpose of this invention there are to be understood primarily fabrics of textile fibers, but paper, leather, woven goods of straw, and the like are also included.

In U. S. Patent No. 2,361,277 there is described the manufacture of hardenable emulsions serving as binding agents suitable for printing with pigments, which contain as the aqueous, external phase a solution of an alkali caseinate, formaldehyde and, in a preferred form of the process, also at least one substance which is capable of forming hardenable condensation products with formaldehyde such as, for example, urea, thiourea, guanidine, dicyandiamide, melamine or the like. It is always a question of using substances of amide character which are known as components of the so-called amide-formaldehyde resins. These resin-forming additions are used in known processes chiefly in the form of water-soluble primary condensates, that is to say methylol compounds. The oily internal phase consists of an organic liquid which is immiscible with water, and of which the boiling point is advantageously not below 100° C. and not substantially above 200° C.

The emulsions serving as binding agents obtainable by the aforesaid process have the disadvantage that they contain large quantities of formaldehyde partially in a free form or a form in which it is easily split off, and the effect of this is very unpleasant in the working up.

The present invention is based on the observation that the foregoing disadvantage can be avoided by using, instead of methylol compounds of the aforesaid substances of amide character, such as for instance urea, thiourea, guanidine, dicyandiamide, melamine and the like, water-soluble ethers of these methylol compounds, which ethers are obtained in known manner, for example, from the methylol compounds by reaction with the appropriate alcohols or by condensation of the amide compounds with formaldehyde in the presence of the appropriate alcohols. For the etherification there may be used aliphatic alcohols which are substantially illimitedly miscible with water and which contain one or more hydroxyl groups, for example, methyl alcohol, ethyl alcohol, glycol, glycerine, isopropyl alcohol, etc.

As examples of such etherification products there may be mentioned: Dimethylol-urea dimethyl ether, dimethylol-urea diethyl ether, hexamethylol-melamine methyl ether, hexamethylol-melamine glycol ether, etc.

Most of these ethers are easily soluble in water and are quite stable in aqueous, neutral solution, that is to say, the alcohol or formaldehyde is only slowly split off. They can therefore be associated especially advantageously with solutions of alkali caseinates of approximately neutral reaction, which are easily coagulated and hardened by formaldehyde or compounds which split off formaldehyde without observing special precautions. As is known, casein is an eminently suitable emulsifying agent for "oil-in-water" emulsions. As compared with other water-soluble emulsifying agents and thickening agents it has the special advantage that when heated together with an etherified methylol compound used in accordance with the invention it hardens and becomes embedded in the resulting resinous mass in the form of an insoluble constituent, notwithstanding the relatively good stability of the whole aqueous solution. It is surprising that this hardening, which is best accomplished at temperatures above 100° C., takes place without the action of a catalyst. Thus, after hardening on the fibre practically only insoluble bodies remain, and this is of very great importance in connection with the fastness to water and washing of the print effects.

With regard to the oily phase of the emulsions the process of the present invention corresponds substantially with the process of the prior specification hereinbefore referred to. In addition to the liquids mentioned in that specification, such as chlorobenzene, lacquer benzine, sangajol, xylene, and tetralin, there may be mentioned for example, toluene, ligroin, decahydronaphthalene, dipentene, trichlorethylene and the like. The organic liquid should not boil at a temperature substantially below 100° C. or substantially above 200° C., and it should be at most only partially miscible with water. If desired, it may also contain non-volatile constituents, for example, oil-soluble artificial resins, for example, butylated carbamide-formaldehyde resins, or furthermore rubber, chlorinated rubber, ethyl-cellulose, benzyl-cellulose, polyvinyl resins, polystyrene, drying oils, paraffin wax, waxes or the like.

The new binding agents in the form of emulsions are generally made by first dissolving acid casein in water by the addition of one of the usual alkaline digesting agents, for example, ammonia, caustic soda solution, borax, triethanolamine or the like. Especially stable and finely dispersed emulsions are obtained by using acid casein which has been purified in a known manner, particularly by the process of U. S. Patent No. 2,372,986. In the resulting casein size there is emulsified a quantity of the organic liquid sufficient for the purpose of thickening. The methylol methyl ether of the compound capable of forming an amide resin is added in any stage of the manufacture of the emulsions i. e. before, during or after the emulsification of the organic liquid. The aqueous phase of the emulsion may contain, in addition to the casein solution, other substances having an emulsifying or dispersing action, such as sulforicinoleates, fatty alcohol sulfonates and the like, or also an additional binding agent, for example, a water-soluble cellulose ether, starch, dextrin, gum arabic, polyvinyl alcohol, water-soluble condensates of polyhydric alcohols with polybasic acids, rubber dispersions or the like.

To the resulting binding agents in the form of emulsions, which have a thinly viscous to salve-like consistency, there may be added a very wide range of substances in dissolved or finely dispersed form suitable for improving fibres. As such additions there come principally into consideration insoluble dyestuffs, filling materials, softening agents, matting agents and the like.

Such preparations are advantageously applied by means of printing machines, but they may also be applied to the fibrous material by brushing with or without the use of stencils, or if desired by spraying.

The effect produced is advantageously fixed by means of a short heat treatment, but the fixation may also be accelerated or improved by the action of acids or substances of acid reaction in liquid or vapour form. In certain cases an adequate fixation is brought about at ordinary temperature with or without the action of hardening agents. The prints so obtained are in many cases distinguished by very good fastness to washing.

The following examples illustrate the invention, the parts being by weight:

Example 1

52.5 parts of acid casein are dissolved with the addition of 5 parts of an ammonia solution of 22 per cent. strength and 2 parts of phenol in 340.5 parts of water. The resulting solution is mixed with 25 parts of butanol and 85 parts of dimethylol-urea dimethyl ether, before or after 450 parts of lacquer benzine boiling at 140–200° C. are emulsified in the solution by means of a high speed stirring mechanism. In this manner 960 parts of a smooth, viscous binding agent which remains unchanged for long periods are obtained, and 40 parts of titanium white are incorporated therein by fine printing. A lustrous viscose fabric is printed with the resulting paste, and the fabric is heated for 10 minutes at 140° C. A strong matting effect is obtained which has very good fastness to washing and rubbing and which imparts no appreciable stiffening to the material. By using red oxide of iron instead of titanium white, bright brown prints are obtained. Fixation may also be brought about by the action of acidified steam at temperatures slightly above 100° C.

Example 2

300 parts of a sodium caseinate solution of 10 per cent. strength are diluted with 40 parts of water and 20 parts of butanol, and then there are added 100 parts of a resin-like, viscous, but easily water-soluble product which has been obtained from dimethylol-urea dimethyl ether by heating the latter until a clear film-forming syrup, which is no longer crystalline, is obtained. 500 parts of a solution of 1 per cent. strength of crude rubber in solvent naphtha are emulsified in the mixture by means of a suitable apparatus. There is obtained a thinly viscous binding agent which dries to give a clear film, and to which are then added, for example, 40 parts of an aqueous pigment suspension containing 30 per cent. of the azo-dyestuff from diazotised 1-amino-2-nitro-4-chlorobenzene and the anilide of acetoacetic acid, 30 per cent. of dextrin and 1.5 per cent. of sodium lauryl alcohol sulphonate. There is obtained a feebly viscous printing paste, which when printed on satin composed of staple fibres of regenerated cellulose and then fixed for 10 minutes at 150° C., yields bright prints which are fast to washing and which hardly stiffen the fabric to any appreciable extent.

Example 3

18 parts of acid casein which has been purified in the manner described in Example 4 of U. S. Patent No. 2,372,986 are dissolved in 203 parts of water with the addition of 2 parts of borax. The resulting solution of almost neutral reaction is mixed with 4.5 parts of highly sulphonated castor oil and 22.5 parts of gas-black, and the latter is dispersed as finely as possible by grinding in a colour mill. The pigment suspension is mixed with 200 parts of a solution of hexa-methylol-melamine methyl ether which has been evaporated to give a syrup of 70 per cent. strength, and in this way a thin coloured ink is obtained.

The latter is thickened by emulsifying therein 550 parts of a solution of 5 per cent. strength of an oil-soluble artificial resin, for example, a urea-formaldehydebutanol resin, in chlorobenzene to form a viscous paste which prints well. Since it contains no acid catalyst, the latter paste can be stored for several weeks practically without undergoing any change. When printed on cotton material and hardened for 5 minutes at 160° C. it produces beautiful black effects, which easily withstand repeated washings at the boil. Instead of gas-black there may be used, for example, N-dihydro-2:1:1':2'-anthraquinoneazine, which also yields very fast prints.

Example 4

675 parts of trichlorethylene are emulsified by means of a high speed stirring device in 75 parts of a neutral solution of 11 per cent. strength of triethanolamine caseinate which also contains 1.75 parts of butanol and 0.25 part of disodium citrate. The emulsion is diluted with 80 parts of water and then 70 parts of hexamethylol melamine methyl ether are added. The resulting binding agent has a content of dry substance amounting to only 7.8 per cent., it is stable for long periods, and upon drying leaves an excellent hardenable residue.

The binding agent so obtained may be utilised, for example, by adding to 9 parts thereof 1 part of a paste containing 15 per cent. of finely dispersed copper phthalocyanine, 5 per cent. of methyl-cellulose and 80 per cent. of water. In this manner a viscous, smooth printing colour is obtained, which yields bright colour effects when printed on a cotton or linen fabric. The printed materials, already after being hung up for 24 hours, have a remarkable fastness to washing, which can be still further improved, for example, by steaming in the presence of acid or by heating for a short time at a temperature ranging from 140° C. to 200° C.

By using, instead of copper phthalocyanine, a corresponding quantity of the dyestuff obtained by coupling diazotised 1-amino-2-methyl-4-chlorobenzene with 2:3-hydroxynaphthoic acid 4-chloro-2'-methylanilide, bright red prints are obtained, which are likewise of very good fastness to light and washing.

Example 5

5 parts of sodium caseinate are dissolved in 185 parts of water with the addition of 10 parts of butyl alcohol. 800 parts of benzine boiling at 100–140° C. are emulsified in the resulting solution, whereby a good salve-like paste is obtained.

640 parts of the resulting emulsion are diluted with a solution of 8 parts of crystalline dimethylolurea diethyl ether in 342 parts of water, and there are finally added 10 parts of an aqueous suspension containing 3 parts of black iron oxide pigment and 1 part of sodium caseinate.

A piece of cotton poplin is treated on the foulard with the dye liquor so obtained. A level, silver-gray colouring is obtained. After being dried, the fabric is impregnated with 1000 parts of a solution containing 10 parts of formic acid and also a softening agent, and then the material is dried and calendered hot. The feel of the fabric is practically unaffected by the colouring effect, which is of good fastness to washing and rubbing.

Example 6

A feebly viscous pigment suspension is prepared with 25 parts of the scarlet red pigment dyestuff obtained by coupling diazotised 2:5-dichloraniline with 2:3-hydroxynaphthoic acid ortho-anisidide, 7 parts of pure ammonium caseinate, 2 parts of sulphoricinoleate, 1 part of cyclohexanol and 65 parts of water. The suspension is diluted with 200 parts of water, and 100 parts of hexamethylolmelamine glycol ether. 600 parts of a solution of 1 per cent. strength of ethyl-cellulose in a mixture of dipentene and toluene in the ratio of 1:2 are emulsified in the resulting pigment-resin solution by means of a high speed stirring apparatus.

In this manner an excellent smooth and viscous printing paste is obtained, which is applied to a fabric of glass or nylon fibres by means of a printing machine. The prints are subjected for 5 minutes to a temperature of 150° C., and are then excellently fixed. For example, they can be boiled for a long time in a solution of soap and sodium carbonate without fading.

What I claim is:

1. In the manufacture of a hardenable emulsion serving as binding agent and suitable for the fixation of finely dispersed pigments on fibrous materials, the improvement which comprises adding, in any stage of the manufacture of the emulsion, a water-soluble ether of a substantially illimitedly water-miscible aliphatic alcohol with a methylol compound of a substance selected from the group consisting of urea, thiourea, guanidine, dicyandiamide and melamine to an emulsion, the aqueous external phase of which consists of a solution which contains acid casein brought into solution by means of an alkaline substance, and the oily internal phase of which consists essentially of an organic liquid which is at most only partially miscible with water, which has a boiling point not substantially below 100° C. and not substantially above 200° C. and which is non-reactive with the aqueous phase and the constituents thereof.

2. In the manufacture of a hardenable emulsion serving as binding agent and suitable for the fixation of finely dispersed pigments on fibrous materials, the improvement which comprises adding, in any stage of the manufacture of the emulsion, a water-soluble ether of a substantially illimitedly water-miscible aliphatic alcohol with a methylol compound of urea to an emulsion, the aqueous external phase of which consists of a solution which contains acid casein brought into solution by means of an alkaline substance, and the oily internal phase of which consists essentially of an organic liquid which is at most only partially miscible with water, which has a boiling point not substantially below 100° C. and not substantially above 200° C. and which is non-reactive with the aqueous phase and the constituents thereof.

3. In the manufacture of a hardenable emulsion serving as binding agent and suitable for the fixation of finely dispersed pigments on fibrous materials, the improvement which comprises adding, in any stage of the manufacture of the emulsion, a water-soluble ether of a substantially illimitedly water-miscible aliphatic alcohol with a methylol compound of melamine to an emulsion, the aqueous external phase of which consists of a solution which contains acid casein brought into solution by means of an alkaline substance, and the oily internal phase of which consists essentially of an organic liquid which is at most only partially miscible with water, which has a boiling point not substantially below 100° C. and not substantially above 200° C. and which is non-reactive with the aqueous phase and the constituents thereof.

4. A hardenable emulsion serving as binding agent suitable for the fixation of finely dispersed pigments on fibrous materials, the aqueous external phase of said emulsion consisting of a solution containing acid casein brought into solution by means of an alkaline substance and also containing a water-soluble ether of a substantially illimitedly water-miscible aliphatic alcohol with a methylol compound of a substance selected from the group consisting of urea, thiourea, guanidine, dicyandiamide and melamine, and the oily internal phase of the said emulsion consisting essentially of an organic liquid which is at most only partially miscible with water and which has a boiling point not substantially below 100° C. and not substantially above 200° C., said liquid being non-reactive with the aqueous phase and the constituents thereof.

5. A hardenable emulsion serving as binding agent and suitable for the fixation of finely dispersed pigments on fibrous materials, the aqueous external phase of said emulsion consisting of a solution containing acid casein brought into solution by means of an alkaline substance and also containing a water-soluble ether of a substantially illimitedly water-miscible aliphatic alcohol with a methylol compound of urea, and the oily internal phase of the said emulsion consisting essentially of an organic liquid which is at most only partially miscible with water and which has a boiling point not substantially below 100° C. and not substantially above 200° C., said liquid being non-reactive with the aqueous phase and the constituents thereof.

6. A hardenable emulsion serving as binding agent and suitable for the fixation of finely dispersed pigments on fibrous materials, the aqueous external phase of said emulsion consisting of a solution containing acid casein brought into solution by means of an alkaline substance and also containing a water-soluble ether of a substantially illimitedly water-miscible aliphatic alcohol with a methylol compound of melamine, and the oily internal phase of the said emulsion consisting essentially of an organic liquid which is at most only partially miscible with water and which has a boiling point not substantially below 100° C. and not substantially above 200° C., said liquid being non-reactive with the aqueous phase and the constituents thereof.

7. Fibrous materials, whereon finely dispersed pigments are fixed by an emulsion, the aqueous external phase of which consists of a solution containing acid casein brought into solution by means of an alkaline substance and also containing a water-soluble ether of a substantially illimitedly water-miscible aliphatic alcohol with a methylol compound of a substance selected from the group consisting of urea, thiourea, guanidine, dicyandiamide and melamine, and the oily internal phase of which emulsion consists essentially of an organic liquid which is at most only partially miscible with water and which has a boiling point not substantially below 100° C. and not substantially above 200° C., said liquid being non-reactive with the aqueous phase and the constituents thereof.

LUZIUS SCHIBLER.

REFERENCES CITED

The following references are of record in the file of this patent:

UNITED STATES PATENTS

| Number | Name | Date |
|---|---|---|
| 2,254,001 | Conaway | Aug. 26, 1941 |
| 2,310,795 | La Piana et al. | Feb. 9, 1943 |
| 2,315,745 | Sorenson | Apr. 6, 1943 |
| 2,334,097 | Howald et al. | Nov. 9, 1943 |
| 2,361,277 | Enderlin et al. | Oct. 24, 1944 |
| 2,372,986 | Schibler | Apr. 2, 1945 |
| 2,402,032 | Fischer | June 11, 1946 |
| 2,453,752 | La Piana et al. | Nov. 16, 1948 |